United States Patent
Byron et al.

(10) Patent No.: US 10,430,426 B2
(45) Date of Patent: Oct. 1, 2019

(54) RESPONSE EFFECTIVENESS DETERMINATION IN A QUESTION/ANSWER SYSTEM

(71) Applicant: International Business Machines Corporation, Armonk, NY (US)

(72) Inventors: Donna K. Byron, Petersham, MA (US); Lakshminarayanan Krishnamurthy, Austin, TX (US); Priscilla Santos Moraes, Austin, TX (US); Niyati Parameswaran, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 543 days.

(21) Appl. No.: 15/145,063

(22) Filed: May 3, 2016

(65) Prior Publication Data
US 2017/0322939 A1 Nov. 9, 2017

(51) Int. Cl.
*G06N 20/00* (2019.01)
*G06F 16/332* (2019.01)
*G06F 16/2457* (2019.01)

(52) U.S. Cl.
CPC .... *G06F 16/24578* (2019.01); *G06F 16/3329* (2019.01); *G06N 20/00* (2019.01)

(58) Field of Classification Search
CPC .............. G06F 17/3063; G06F 17/30654
USPC ....................................................... 707/730
See application file for complete search history.

(56) References Cited

U.S. PATENT DOCUMENTS

| | | |
|---|---|---|
| 6,012,053 A | 1/2000 | Pant et al. |
| 6,665,655 B1 | 12/2003 | Warner et al. |
| 6,766,320 B1 | 7/2004 | Wang et al. |
| 7,111,002 B2 | 9/2006 | Zhang et al. |
| 7,376,620 B2 | 5/2008 | Kay et al. |
| 7,461,059 B2 | 12/2008 | Richardson et al. |
| 7,725,463 B2 | 5/2010 | Hurst-Hiller et al. |
| 7,747,601 B2 | 6/2010 | Cooper et al. |
| 7,809,664 B2 | 10/2010 | Heck |
| 7,836,050 B2 | 11/2010 | Jing et al. |
| 7,996,400 B2 | 8/2011 | Morris et al. |
| 8,082,264 B2 | 12/2011 | Bierner |
| 8,122,021 B2 | 2/2012 | White et al. |
| 8,234,231 B2 | 7/2012 | Kelly |
| 8,346,701 B2 | 1/2013 | Wang et al. |
| 8,412,514 B1 | 4/2013 | Feng et al. |
| 8,543,565 B2 | 9/2013 | Feng |

(Continued)

*Primary Examiner* — Jean B Fleurantin
(74) *Attorney, Agent, or Firm* — Cantor Colburn LLP; Will Stock

(57) ABSTRACT

Answer effectiveness evaluations include providing, by a computing device, an answer to a search query received from a user, and in response to receiving a subsequent search query from the user, determining by the computing device a level of effectiveness of the answer to the search query with respect to the user. The determination includes comparing aspects of the search query to aspects of the subsequent search query, calculating, based on the comparing, a relevance score that indicates a measure of similarity between the aspects of the search query and the aspects of the subsequent search query, and determining that the answer effectively answers the search query when the relevance score exceeds a threshold value.

17 Claims, 4 Drawing Sheets

(56) References Cited

U.S. PATENT DOCUMENTS

| | | |
|---|---|---|
| 2004/0243568 A1 | 12/2004 | Wang et al. |
| 2008/0114725 A1* | 5/2008 | Indeck ................... G06F 16/22 |
| 2008/0114751 A1 | 5/2008 | Cramer et al. |
| 2012/0185446 A1* | 7/2012 | Sundaresan ........... G06F 16/355 |
| | | 707/692 |
| 2014/0272909 A1 | 9/2014 | Isensee et al. |
| 2015/0039602 A1* | 2/2015 | Grunick .............. G06F 17/3053 |
| | | 707/728 |

* cited by examiner

RESPONSE EFFECTIVENESS DETERMINATION IN A QUESTION/ANSWER SYSTEM

BACKGROUND

Question/Answer (QA) systems may engage Subject Matter Experts (SMEs) to create the ground truth (candidate QA pairs) as part of QA system training. Generally, the process for this may have a unique set of questions that are given to each SME to create this set. QA systems, as well as other non-QA systems, may also employ user feedback as part of the QA system training. For example, some systems may provide a user interface with a binary classification option to the user requesting them to proactively flag an answer with some indication of whether the answer received is relevant to the question posed, and may also provide the user with the means to leave behind a comment. Thus, current QA systems typically rely on explicit user input and/or feedback to determine the effectiveness of an answer that is generated in response to a search query.

SUMMARY

Embodiments are directed to a method, system, and computer program product for response effectiveness determination in a question/answer system. A method includes providing, by a computing device, an answer to a search query received from a user. In response to receiving a subsequent search query from the user, the method includes determining by the computing device a level of effectiveness of the answer to the search query with respect to the user. The determination includes comparing aspects of the search query to aspects of the subsequent search query, and calculating, based on the comparing, a relevance score that indicates a measure of similarity between the aspects of the search query and the aspects of the subsequent search query. The answer is determined to effectively answer the search query when the relevance score exceeds a threshold value.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
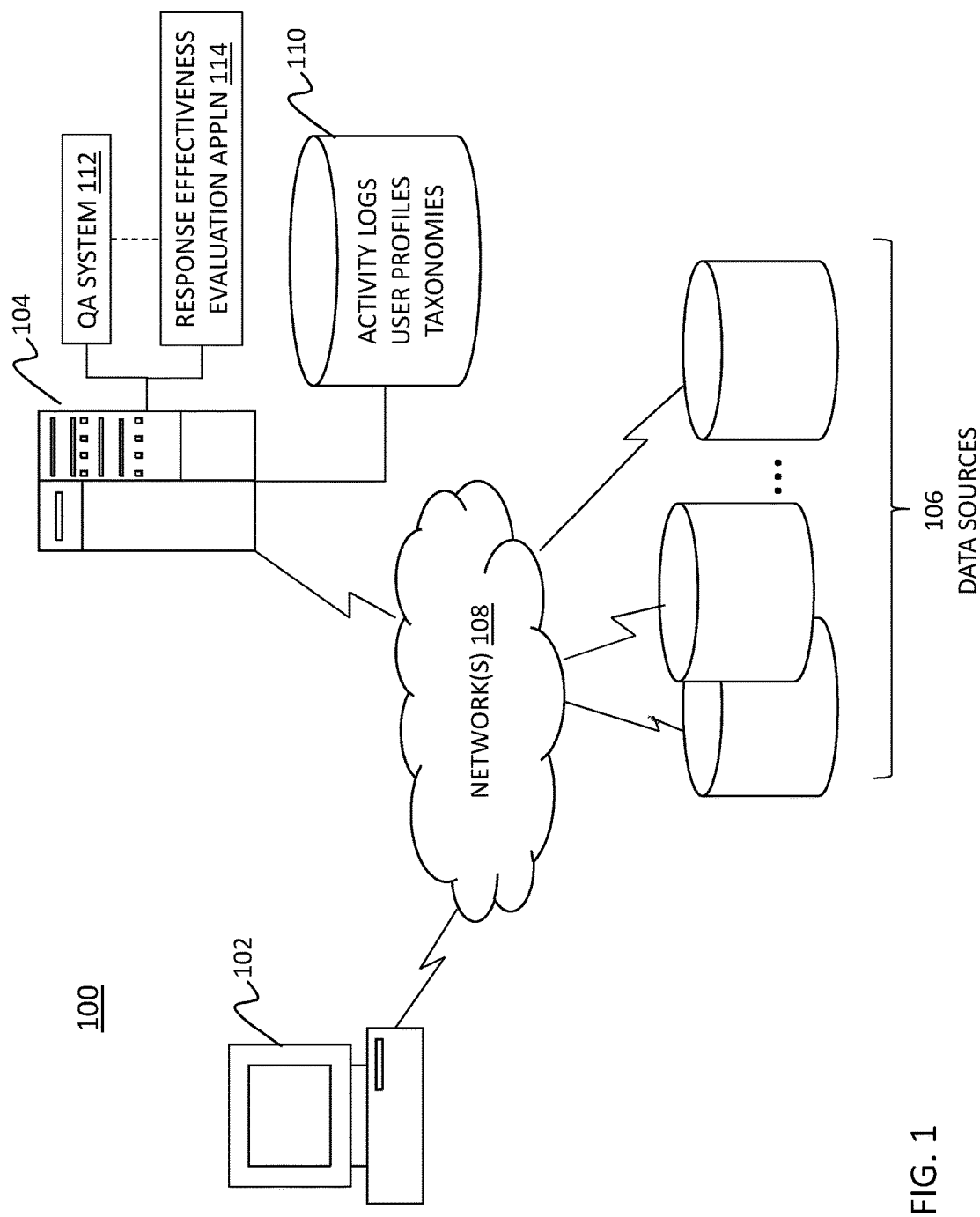
FIG. 1 depicts a block diagram of a system upon which response effective evaluation processes may be implemented according to an embodiment.

Some Question/Answer (QA) systems engage Subject Matter Experts (SMEs) to create the ground truth (candidate QA pairs) as part of QA system training. Generally, the process for this may have a unique set of questions that are given to each SME to create this set. QA systems, as well as other non-QA systems, may also employ explicit user feedback as part of the QA system training. For example, some systems may provide a user interface with a binary classification and request that the user proactively flag an answer with some indication of whether the answers are relevant to the questions. In addition to placing the onus on the user to provide feedback, knowledge acquisition may not be quantifiable as a concept if users are unable to verbalize what they have learned from their experience. In addition, users may have varied experiences and distinct trajectories of comprehension when it comes to working with an application. It may be beneficial to capture the user's understanding as his/her experience with the application increases so that the answers provided by the QA system may be tweaked to match the particular user's expectation. As such, in an effort to obtain further improvements in answer quality and user experience, it may be beneficial to tailor the QA system to adapt in accordance with the user's comprehension and preferences.

In exemplary embodiments, response effectiveness evaluation processes utilize techniques to unobtrusively obtain information about users by watching their natural interactions with a system. The response effectiveness evaluation processes challenge the one-size-fits-all retrieval function in an environment with heterogeneous users, such as those with different levels of knowledge, experiences, and/or cognitive skills. In particular, the processes utilize a metric that facilitates an estimation of the user's stage in the knowledge acquisition process and accordingly adjusts the complexity of the information returned to the user in response to queries.

As will be discussed in greater detail herein, the response effectiveness evaluation processes may implement different strategies that converge to produce an accurate determination of the effectiveness of an answer to a query. If the answer is effective in terms of its relevance and/or clarity from the point of view of the user, the user may be provided with more complex information to deepen his/her investigation of the theme. If subsequent answers are determined to be ineffective in terms of relevance and/or clarity from the point of view of the user, the user may be provided with more generalized information in order to scale back on the complexity of information given. Whether an answer is relevant and/or clear to a user is a determination that is made by the response effectiveness evaluation processes based on an analysis of aspects of one or more queries generated by the user subsequent in time to a previously submitted query.

In particular, the response effectiveness evaluation processes receive a query from the user that is submitted subsequent to a previous query by the user, and compares the two queries by applying varying techniques to elements of the queries to determine whether the subsequent query reflects an increase or decrease in the understanding of the subject matter queried by the user, and thereby reflects that the answer provided to the user was either effective (e.g., relevant and/or clear) or ineffective (irrelevant and/or unclear). The processes can be iterated through multiple queries for a given topic resulting in corresponding changes to the user's understanding of the subject matter. The response effectiveness evaluation processes generates and updates over time a user understanding score to reflect the user's current level of understanding for one or more subject areas.

In an embodiment, the response effectiveness evaluation processes are configured to generate and update a user profile that reflects this understanding via the user understanding score, and the user profile may be used to build or modify a user-generated subsequent query prior to submitting the subsequent query to a search process, such that the modified subsequent query is designed to provide more particularized (or more generalized) data for the answer based on the level of the user's understanding. Alternatively, the user-generated subsequent search query may not be modified, but instead, the resulting information returned from the subsequent query may be processed and/or filtered to gather more particularized (or more generalized) information from the results for the user based on the user's level of understanding. These and other features of the response effectiveness evaluation processes will now be described.

Referring now to FIG. 1, a system 100 upon which response effectiveness evaluation processes may be implemented will now be described in accordance with an embodiment. The system 100 of FIG. 1 includes a user device 102, a host system computer 104, and data sources 106, each of which is communicatively coupled to one or more networks 108.

The user device 102 may be operated by an end user of the response effectiveness evaluation processes who is seeking information about a topic and enters queries via the user device 102 to initiate a search for an answer to the queries. The user device 102 may be implemented as a personal computer, such as a desktop or laptop, or may be a portable device, such as a smart phone, tablet computer, or personal digital assistant. In one embodiment, the user device 102 accesses the host system computer 104, which in turn, provides an interface for implementing one or more search queries. In another embodiment, the user device 102 may employ a search engine to enter a search query, and the search engine may communicate with the host system computer 104 to facilitate the search queries. Applications that may be implemented by the user device 102 include a standard and/or mobile web browser, an email client application, a textual and/or a graphical user interface, a customized web browser, a plugin, an Application Programming Interface (API), and/or a custom application.

The host system computer 104 may be implemented as a high-speed computer processing device capable of handling the volume of activities conducted among user devices, such as user device 102, the data sources 106, and the host system computer 104. The host system computer 104 may be operated by an entity that provides the response effectiveness evaluation processes as a service to others. For example, the host system computer 104 may execute one or more applications to coordinate with the data sources 106, a storage device 110, and user device 102, to perform a variety of functions, such as facilitate user searches, evaluate user search queries, generate and update user profiles, and modify subsequent searches and/or search results to accommodate a user's current level of understanding with respect to a given topic.

Applications include Question Answering (QA) system application (QA application 112), examples of which may include, but are not limited to the IBM WATSON™ framework or other QA application, a search engine application, a natural language processing (NLP) application, and/or other application that allows for the answering of questions posed by a user by querying stored information, e.g., in a data store.

Question Answering (QA) systems, such as the IBM WATSON™ QA framework, may include an application of advanced natural language processing, information retrieval, knowledge representation and reasoning, and machine learning technologies to the field of open domain question answering. The IBM WATSON™ QA framework facilitates hypothesis generation, massive evidence gathering, analysis, and scoring. The IBM WATSON™ QA framework takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure. A high-level view of the IBM WATSON™ QA framework is shown and described in FIG. 4.

Applications also include response effectiveness evaluation application 114. Either of the QA application 112 and response effectiveness evaluation application 114 may be a stand-alone application, or may be an applet, application, script, or extension that may interact with or be executed within a component of the other of the QA application 112 and response effectiveness evaluation application 114. The response effectiveness evaluation application 114 performs the exemplary processes described herein with some coordination with the QA application 112. The response effectiveness evaluation application 114 may include one or more user interfaces, such as browsers and textual or graphical user interfaces, through which users, such as a user of user device 102, may access response effectiveness evaluation application 114.

The data sources 106 include databases that collectively span multiple knowledge domains. The data sources 106 may include any network-enabled sources of electronic information that are accessible via search tools, such as the QA application 112, and the response effectiveness evaluation application 114 described herein. In embodiments, a user submits a search query through a search engine, which in turn accesses one or more of the data sources 106 to facilitate a search for an answer to the query. The data sources 106, as well as storage device 110, may be implemented using a variety of devices for storing electronic information. It is understood that the storage device 110 may implemented using memory contained in the host system computer 106 or it may be a separate physical device, as illustrated in FIG. 1. The data sources 106 and the storage device 110 may be logically addressable as consolidated data sources across a distributed environment that includes one or more networks, such as network(s) 108. Information stored in the data sources 106 and the storage device 110 is retrieved and manipulated via the host system computer 106, as well as by end users of the response effectiveness evaluation processes.

In an embodiment, the storage device 110 stores user activity logs, user profiles, and one or more taxonomies and/or ontologies. The user activity logs can include historical information based upon queries posed by the user previously in a session, or in one or more prior sessions. For example, the user activity logs may store queries submitted by the user, along with answers provided in response thereto. The response effectiveness evaluation processes analyze the logs to glean information about the user's likes/dislikes, which involves his/her preferences based on the answers rendered. Such information may be utilized to render improved search results with time and truly learn from the user persona.

The user profiles may include information that is curated in the very beginning before the users start to use the response effectiveness evaluation processes. This could include information such as a user's business and/or personal credentials, such as the user's professional skills and experience, the user's interests or hobbies, and other types of information. The initial user profile created before the user begins to use the response effectiveness evaluation processes may be used as a baseline of information by the response effectiveness evaluation processes. For example, a user's credentials can provide a baseline for the user's understanding of certain topics that are related to his or her skills and experience. In this example, the user may be preliminarily assigned a user understanding score that is higher than scores assigned to the general public, who may have no medical credentials in their profiles. The user understanding score can be a variable between 0-1, 1-10, or other metric. With respect to a given topic or subject area, the actual value that is assigned to each user may be determined using various techniques, such as frequency of occurrence of terms, semantic relations of terms and phrases, and other techniques. If insufficient data exists for a user profile, the process may assign a default user understanding score, which may be an average of such scores in the general population.

The user profile may be updated over time in response to query analyses conducted from user searches. In particular, the user profile may be updated over time by an analysis of the activity logs of the user, factoring in the kinds of searches he/she makes. Such information may be utilized when the aim of the response effectiveness evaluation processes is to render improved results with time and truly learn from the user persona. Thus, the user profile may be a persistent feature in that it may cater to the user's specific likes and dislikes while gauging the user's knowledge and deriving a learning curve of sorts based off of the user's various activity log data. The user profiles are updated by the response effectiveness evaluation processes to reflect changes in the level of the user's understanding with respect to a topic. These aspects of the user profiles are described further herein.

The taxonomies and/or ontologies may be associated with any domain or subject matter, such as Universal Medical Lexicon System (UMLS), or may be more generic concept databases, such as WordNet. The taxonomies and/or ontologies may be accessed during analyses of the user search queries. For example, taxonomies and ontologies for a given area or subject can be accessed to determine similarities between two search queries in terms of their main focus, whether dependencies exist among aspects of the queries, and whether one query (subsequent in time to a previous query) paraphrases the previous query. These features are described further herein.

The networks 108 may be any type of known networks including, but not limited to, a wide area network (WAN), a local area network (LAN), a global network (e.g. Internet), a virtual private network (VPN), and an intranet. The networks 108 may be implemented using wireless networks or any kind of physical network implementation known in the art, e.g., using cellular, satellite, and/or terrestrial network technologies. The networks 108 may also include short range wireless networks utilizing, for example, BLUETOOTH™ and WI-FI™ technologies and protocols.

While the system 100 of FIG. 1 illustrates an embodiment in which the host system computer 106 implements applications for performing the response effectiveness evaluation processes described herein, it will be understood that at least a portion of the processes can be implemented by the user device 102. In addition, while only one user device 102 is shown in the FIG. 1 for ease of illustration, it will be understood that any number of these devices can be employed in order to realize the advantages of the embodiments described herein.

Figure 2:
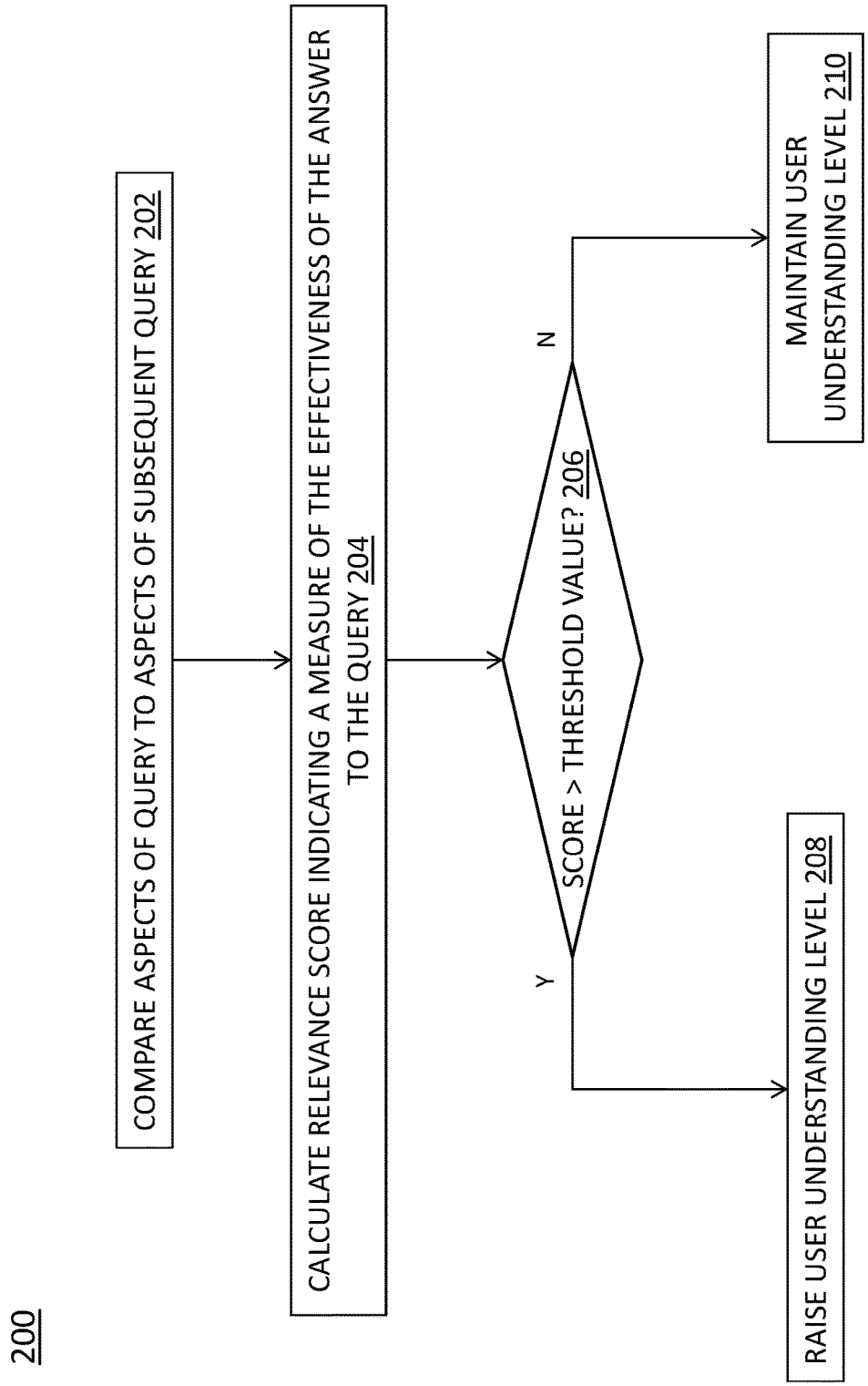
FIG. 2 depicts a flow diagram of a high-level process for implementing response effectiveness evaluations according to an embodiment.

Turning now to FIG. 2, a high-level process for implementing the response effectiveness evaluation processes will now be described in an embodiment. The process 200 of FIG. 2 assumes that a user has submitted a query via a search engine, received an answer to the query, and has submitted a subsequent query (subsequent in time to the above-identified query). In block 202, in response to receiving the subsequent search query from the user, the response effectiveness evaluation application 114 compares aspects of the subsequent query to aspects of the previous query. For example, aspects may include a focus or theme of the queries, any dependencies between elements of the queries, and other relationships, such as time duration between user queries, as described further herein.

In block 204, the response effectiveness evaluation application 114 calculates, based on the comparing, a relevance score that indicates a measure of effectiveness of the answer to the previous query. The measure of effectiveness can be calculated by similarity scoring functions based on select attributes of the queries. A detailed embodiment of the relevance score calculation is described further in FIG. 3 (see generally 350 in FIG. 3).

The response effectiveness evaluation processes compare the relevance score to a predetermined threshold value. In an embodiment, the predetermined threshold value may be the user's current level of understanding, which is expressed as the understanding score, and is stored in the user profile. Alternatively, if no data exists in the profile concerning the user's understanding of the topic, the threshold value may be a preset default value. In block 206, if the relevance score exceeds the threshold value, this means that the user's understanding of the topic of the query has increased as compared to the user's level of understanding prior to the query. The user understanding score in the corresponding user profile is increased in value in block 208. The increase in the value may be an arbitrary incremental increase of a fixed amount or may be derived from calculations that apply some weight or relevance to particular features identified during the relevance score determination process.

Returning to block 206, if the threshold value is not exceeded or remains constant, this means that the user understanding has not increased. In this scenario, the user understanding level, indicated by the understanding score, in the corresponding user profile is maintained in block 210.

In a detailed implementation of the response effectiveness evaluation processes, the comparison and relevance score calculations can be performed using various techniques. The processes may involve an ensemble of natural language approaches that help evaluate the query at both a syntactic and a semantic level. The processes may identify the LAT (Lexical Answer Type, such as terms in the question that indicate what type of entity is being asked for), and focus, such as the part of the question which is a reference to the answer, using predictive analytics techniques, such as those provided by the WATSON™ QA framework. The processes may also identify dependencies in the query using SIRE (Statistical Information Relationship Extraction) or any other such relationship extraction service in addition to applying algorithmic paradigms for semantic role labeling. The processes may detect paraphrases through an aggregated syntax and semantic similarity score. In an embodiment, a lexical similarity score for a given query may be rendered through an ensemble of text similarity algorithms such as Cosine Similarity, Jaro Winkler, Levenshtein and so forth, while a syntactic similarity score may be rendered through the generation of contextualized phrasal vectors using a Bayesian model. It may also detect aspects of the query using Graph algorithms that map nodes to attributes. The response effectiveness evaluation processes combine one or more of these scores to derive the relevance score described herein.

Figure 3:
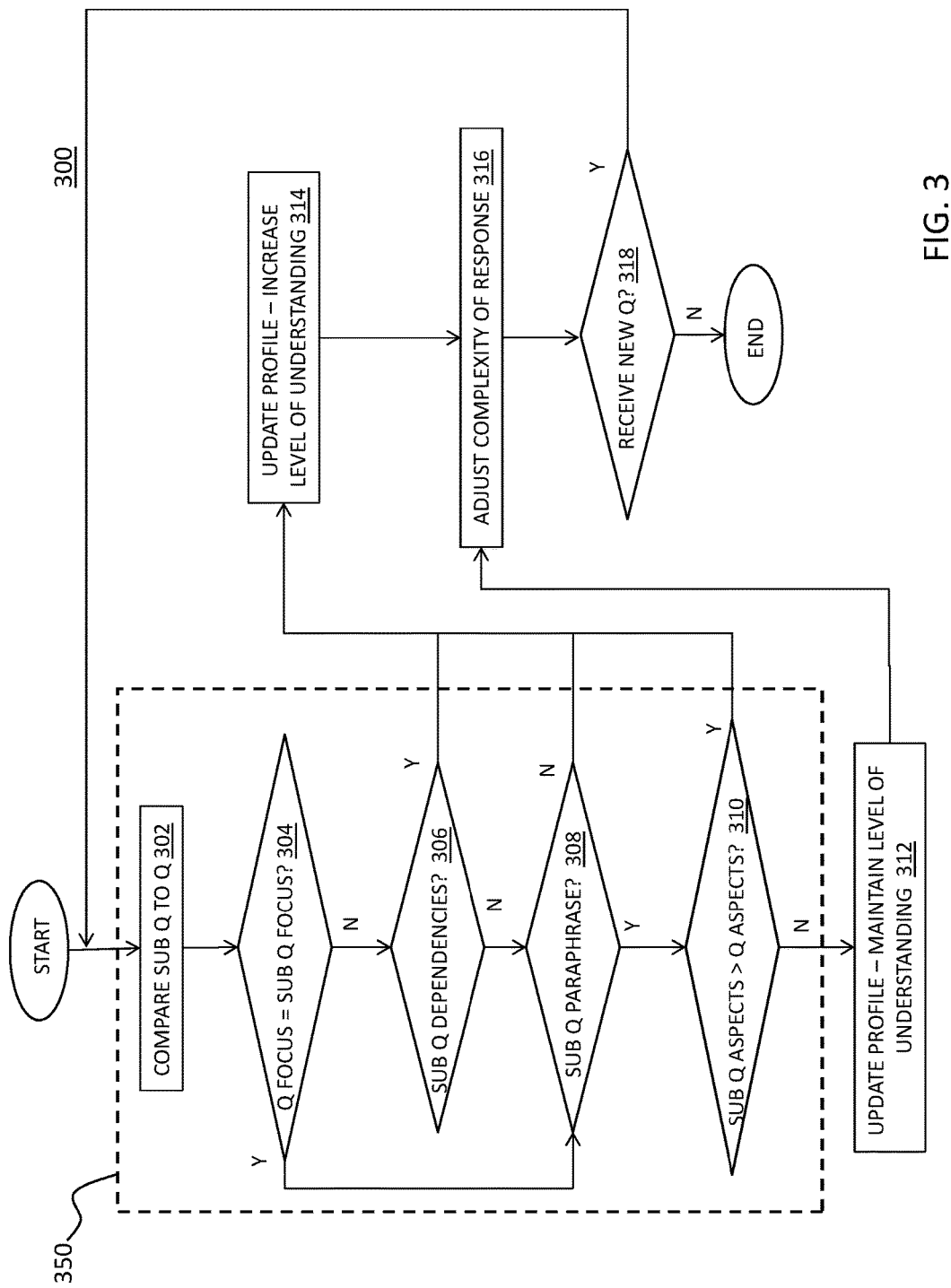
FIG. 3 depicts a flow diagram of a detailed process for implementing response effectiveness evaluations according to an embodiment.

Turning now to FIG. 3, a flow diagram of a detailed process 300 for implementing the response effectiveness evaluation features will now be described in an embodiment. The process 300 of FIG. 3 assumes that a user has entered a second or subsequent query to a search engine after receiving an answer to a first or previous query via the system.

In block 302, in response to receiving the subsequent search query from the user, the response effectiveness evaluation application 114 compares aspects of the subsequent query to aspects of the previous query to determine a focus (also referred to herein as "topic") of the queries. The aspects may include domain-specific data elements, such as terms in the queries that are related through a knowledge domain (e.g., as determined using one or more taxonomies and/or ontologies for a given subject area). For example, a term "Alzheimer" is a data element that belongs to the domain "Diseases."

In an embodiment, the focus can be determined using predictive analytics techniques, such as those provided by WATSON™ QA pipeline. The two queries are parsed and relevant entity types are determined. A main entity of the first and second query is determined from the entity types. If these are the same, even if they are represented by different words, such as synonyms, the focus of the two queries is determined to be equal. For instance, the following examples may have the same main entity (e.g., "symptom"): "What are the symptoms of multiple sclerosis?," "What are the evidences that a person has MS?," "What are the signs or expressions of multiple sclerosis?," where the main entities detected may be "symptoms" and "MS."

A focus similarity score can be generated from results of the analysis. The focus similarity score looks at the degree of similarity between the focus of the two queries. For instance, a focus which comprises the same topic wording between the two queries may have a high similarity score, whereby a focus that comprises similar but slightly different wording may have a relatively lower similarity score. In an embodiment, using a scale of 0-1 in which 0 indicates no similarity, a focus similarity score that exceeds, e.g., 0.75 may result in a determination that the focus of the two queries are equal.

In block 304, the response effectiveness evaluation processes determines whether the focus of the subsequent search query is the same as the focus or topic of the previous search query, as determined by the focus similarity score.

When the focus of the two queries is not the same in block 304, this may indicate that either the queries are unrelated or it may indicate that the subsequent query has a dependency on the first query, which may imply a greater understanding of the topic by the user. For example, a query may ask "What are the symptoms of MS?" (where the focus is "symptoms") and the user decides, based on a portion of the answer "fatigue" and knowledge acquired therefrom, that he/she would like to know more about the symptom of fatigue. The user then queries "How can I alleviate fatigue?" "Fatigue" becomes the focus of the new query, which is different than the focus of the previous query "symptoms," but is still related to the focus of the first query by virtue of its dependent relationship.

Dependencies are representative of the domain-specific data elements in the query. Dependencies can be determined using a relationship extraction service, such as SIRE (Statistical Information Relationship Extraction) in addition to applying algorithmic paradigms for semantic role labeling.

Returning now to block 304, if the focus of the two queries is not the same, the response effectiveness evaluation application 114 determines whether there are any dependencies between the aspects of the subsequent query to the aspects of the query in block 306. The response effectiveness evaluation processes may return true in block 306 if the main entity indicates a specialization of an entity in the previous query. In one embodiment, a dependency can be determined when a term in the subsequent query is a hyponym (i.e., a word with a more specific meaning than a general word applicable to it), of a term in the previous query. For example, using the example above, the term "fatigue" may be identified as a hyponym of a symptom in a taxonomy or ontology such as a Universal Medical Lexicon System (UMLS), or even in generic concept databases such as WordNet. Similar to the calculations performed with respect to the focus similarity determination, the process may calculate a dependency score that indicates a measure of the dependency. A dependency score is generated from results of the analysis performed in block 306. The dependency score looks at the degree of relationship in terms of dependencies of the entities found in the queries. In an embodiment, if a taxonomy is used to determine entities in the queries, and there is a dependency in an entity of the second query with respect to an entity in the first query, the processes determine the degree of dependency based on a number of levels that exist between the entities in the taxonomy. For instance, if the dependency score is implemented using a scale of 0-1 in which 0 indicates no dependency, a dependency score of 0.75 may result when the entities are within 1-2 levels of each other. A dependency score of 0.35 indicates a dependency exists but a very tenuous one.

If it is determined that the subsequent query has dependencies on the previous query the response effectiveness evaluation processes may return true (block 306), along with the dependency score, from the analysis of the search queries and the user activity log (which may store a history of each query submitted by the user), the response effectiveness evaluation processes may consider this an indication of the success (effectiveness) of the previously provided answer to the first search query. In this instance, the focus similarity score and the dependency score may be combined to create the relevance score described in FIG. 2. The user profile may be updated in block 314 to reflect this change, as will be described further herein.

If, however, no dependencies are determined in block 306, the response effectiveness evaluation application 114 determines whether the subsequent query paraphrases the query in block 308. A query that paraphrases another query reflects the same question being asked but with different wording. Alternatively, returning to block 304, if the focus of the two queries is determined to be the same, the response effectiveness evaluation application 114 determines whether the subsequent query paraphrases the query in block 308. If the focus of the two queries is the same, and the subsequent query paraphrases the previous query, this is an indication that the user may not understand the answer that was given in response to the previous query and is asking the same question again using different wording.

To determine whether the subsequent query paraphrases the previous query, the response effectiveness evaluation processes may utilize a series of algorithmic paradigms that may enable the assertion of whether the second query is, for example, simply a rewording or a paraphrase of the first query with the intent of the first query still being static, as the user has continued to seek the same information. As indicated above, this assertion may suggest that the answer to the first query was not sufficiently effective in that it did not subjectively provide the user with the information that he/she was seeking and/or did not provide the information in a form that the user considered to be adequate and so a more relevant answer is expected by the user. That is, an answer may be ineffective if the user is determined to not consider the identified answer to be useful or to fully satisfy the intent of the query. The response effectiveness evaluation processes may detect paraphrases through an aggregated syntax and semantic similarity score. The semantic score may be rendered through an ensemble of text similarity algorithms such as Cosine Similarity, Jaro Winkler, Levenshtein and so forth, while the syntactic similarity score may be rendered through the generation of contextualized phrasal vectors using a Bayesian model. The syntax and semantic similarity score can be generated from the results of the analysis performed in block 308. The syntax and semantic similarity score looks at the degree of closeness of the queries in terms of their syntax and semantics. Similar to the above-referenced scores, the syntax and semantic similarity score may use a scale of 0-1 in which 1 indicates no similarity. The lower the score, the greater the confidence that the subsequent query paraphrases the previous query. Thus, if the syntax and semantic similarity score exceeds some defined threshold, such as 0.75, the subsequent query is considered to paraphrase the previous query.

In some implementations, the response effectiveness evaluation processes may determine the presence of paraphrasing using synonym detection techniques, a medical lexicon such as the above-noted UMLS, tools such as WordNet, alternate grammatical structures, etc. For example, the first search query may be "What are the symptoms of MS?," whereas the second search query may include, "What are the signs or expressions of multiple sclerosis?," or "What are the evidences that a person has MST?" In the example, if the determination returns a true, along with the score (block 308), if the syntax and semantic similarity score exceed some minimum threshold value resulting from the analysis of the search queries (i.e., the subsequent query and previous query, which may be stored in a user activity log containing a history of each query submitted by the user), then the response effectiveness evaluation processes may consider this an indication of a lack of success of the previously provided answer to the first search query. For instance, even if the answer to the first search query was accurate, the action of submitting a second search query by paraphrasing the first search query may indicate that the answer provided by response effectiveness evaluation processes for the first search query did not provide an answer that was understood by the user. Since the answer has not increased user understanding, the processes will learn that such answer was not appropriate to the user, allowing the system to adjust and adapt.

By contrast, if the subsequent query does not paraphrase the previous query in block 308, the processes infer that the answer provided was effective in answering the previous query. In this instance, if the subsequent query does not paraphrase the previous query, the relevance score may be calculated from a combined focus similarity score, dependency score, the lexical score and the syntactic score. The user understanding score in the user profile is updated from the relevance score accordingly in block 314.

If, however, the subsequent query paraphrases the previous query in block 308, the response effectiveness evaluation application 114 determines whether the aspect count of the subsequent query exceeds the aspect count of the query in block 310. This process may be implemented using graph algorithms that map nodes to attributes from a taxonomy or ontology to render an aspect count score. The response effectiveness evaluation processes evaluates domain-specific data elements identified in the subsequent search query as compared to domain-specific data elements identified in the search query, to determine changes in the aspects, such as an occurrence of an expansion in the domain-specific data elements for the subsequent search query as compared to the domain-specific data elements for the search query. The value of the aspect count score is commensurate with a level of the expansion. For example, the aspect count score increases in direct relation to increases in the level of expansion, and decreases in direct relation to decreases in the level of expansion. For example, the aspect count may vary based on the subsequent query containing more aspects, new aspects, and/or the same number but different aspects regarding the same topic as the first query when compared to the first search query. For example, the first search query may include "What are the symptoms of multiple sclerosis?" (symptom identification), and the second search query may include, e.g., "What can I do to reduce the expression of multiple sclerosis?" (symptom reduction); "What is the most uncomfortable symptom of multiple sclerosis?" (symptom classification based on comfort scale), where it may be seen by response effectiveness evaluation processes that detailed information about a symptom was asked by the user by adding the modifier "most uncomfortable." The aspect count score can be generated from results of the analysis in block 310. The aspect count score, in an embodiment, can be implemented using a scale of 0-1 in which 0 indicates no increase or change in aspects between the queries.

Response effectiveness evaluation processes may return true, as well as the aspect count score, in block 310 if the aspect count score exceeds some threshold value.

In the example, if response effectiveness evaluation processes returns true from the analysis of the search queries in block 310, which may include the new query and previous queries by the user that may be reflected in the user interaction log, and which may store a history of each query submitted by the user, then response effectiveness evaluation processes may identify the result as a success (effectiveness) of the previously provided answer to the first search query. The processes can therefore learn that this question is being answered satisfactorily. As such, and as generally discussed above, identifying the previously provided answer as effective may result in response process identifying an increase in user understanding. The processes may generate the relevance score from a combined focus similarity score, semantic and syntactic similarity score, and aspect count score (if the focus of the two queries are the same). Otherwise, the relevance score may be generated from a combined focus similarity score, dependency score, semantic and syntactic score, and aspect count score (if the focus of the two queries are not the same). In this instance, the relevance score is used to update the user understanding score in the profile in block 314.

In a situation in which response effectiveness evaluation processes may determine that the second query does not include more, or different, aspects than the previous query in block 310, as determined when the aspect count score does not meet the designated threshold value, response effectiveness evaluation processes may return a false response from decision. As such, the answer to the first query may be considered to be ineffective. Accordingly, in an implementation, response effectiveness evaluation processes may identify a decrease (or no change) in user understanding with respect to the subject of the query (based upon, at least in part, the ineffectiveness of the answer to the first query). Further, response effectiveness evaluation processes may identify a decrease, or lack, of user relevance of the answer provided in response to the first query in block 312. The relevance score in this instance can be generated from a combined focus similarity score, semantic and syntactic similarity score, and aspect count score (if the focus of the two queries is the same). Otherwise, the relevance score may be generated from a combined focus similarity score, dependency score, semantic and syntactic score, and aspect count score (if the focus of the two queries are not the same).

In some implementations, response effectiveness evaluation processes may use a question-based TF-IDF (Term Frequency-Inverse Document Frequency) calculation sub-module. For example, this module may use terms from a given search query and analyze the user activity logs, which include a history of previous queries submitted by the particular user, to determine the frequency count along with the relevancy of the term in the results. This metric may then be used by response effectiveness evaluation processes to analyze and arrive at a conclusion about the type of answer needed. In one example, response effectiveness evaluation processes may use a user's profile to determine the nature of understanding, such as research versus personal health. For instance, the user profile may indicate that the user is a researcher. In the example, response effectiveness evaluation processes may use this information to determine that answers provided to the user may include more detailed and more in-depth answers that may be more relevant to a researcher. By contrast, the user profile may indicate that the user is a patient. In the example, response effectiveness evaluation processes may use this information to determine that answers provided to the user may include less detailed and simpler answers that may be more relevant to a patient inquiring about their personal health. In some implementations, response effectiveness evaluation processes may use a temporality sub-module. For example, this module may use temporal reasoning such as, the time duration between questions (e.g., how long it takes for the user to ask a more sophisticated question regarding the same topic), time period of the day or month (e.g., seasonal) to determine the appropriate answer.

Updates to user profiles by the response effectiveness evaluation application 114 will now be described in an embodiment. The, response effectiveness evaluation processes may update the user profiles and response logic to reflect the state of the system relevance to the user and the user understanding with respect to the topic of the queries. For example, if the user continues to ask questions which are rewording of prior queries, this would imply that the effectiveness of the answers rendered is poor and so the user understanding is poor. This is taken into consideration in the update, as a poor user understanding reflects that since the answer rendered was ineffective, response effectiveness evaluation processes now needs to simplify the answer or work harder at trying to analyze what the user is truly asking for. Alternatively, if the second and/or subsequent questions that the user asks now demonstrate a greater understanding of the topic he/she wants answers on, this would imply that the user now has an increased understanding of the subject at hand and so this will reflect in the update, and the answers rendered by response effectiveness evaluation processes may have more domain specific words and jargon, and/or be relatively more detailed or in-depth. Updates may thus form a cognitive feedback loop for response effectiveness evaluation processes, as it provides implicit feedback on not just whether the answers rendered by response effectiveness evaluation processes are effective or not, but may also provide feedback on whether response effectiveness evaluation processes needs to dial up or dial down the difficulty of the answer passages being rendered based off of the determinations of user understanding.

In block 316, the response effectiveness evaluation processes enhance the subsequent query and/or the complexity of the answer returned based on whether the user understanding has remained unchanged (block 312) or increased (block 314).

A numerical value of this update may take different forms (e.g., scores ranging from 1 to 10 or 0 to 1, or the like) based on design preference. Alternatively, if the questions that the user asks now indicate a more in-depth understanding of the topic he/she wants answers on (e.g., there are an increased number of dependencies and an added number of aspects to the queries he/she is asking), this would imply that the user now has an increased understanding of the subject at hand and so this will reflect in an updated user understanding score which is comparatively higher. That is, the answers rendered by response effectiveness evaluation processes can have more domain specific words and jargon. An active action from response effectiveness evaluation processes may be to provide a more accurate and detailed answer about "fatigue" associated with MS in the answer to the second search query by modifying the query building phase to expand the synonyms by using hyponyms or more specialized terms during the search query as an aspect of adjusting the machine learning algorithm of response effectiveness evaluation processes. The acquisition of such terms may be performed through the term's taxonomy traversal and extraction of the nodes' immediate descendants on the tree.

In some implementations, if the answer for the first search query is determined to be ineffective (e.g., based upon a determination that the second query is a paraphrase of the previous query), response effectiveness evaluation processes may provide to the user the answer for the second search query that may include a less detailed answer than the answer provided for the first search query. For instance, for the first answer to the first search query, response effectiveness evaluation processes may have returned answers to the user that may assume a more detailed and more in-depth understanding of MS by the user, such as the kind of understanding that may be more akin to a researcher. By contrast, based upon determining that of the second query submitted by the user was a paraphrasing of the first search query, response effectiveness evaluation processes may assume a less in-depth understanding of MS, and may return to the user a less detailed and simpler answer that may be more akin to a patient inquiring about their personal health. This may be implemented using hypernyms of a concept as an aspect of adjusting response effectiveness evaluation processes to build queries and look for answers since more general concepts and definitions are more likely to be understood by the user.

Returning to FIG. 3, in block 318, it is determined whether a new query has been submitted by the user. If so, the process returns to block 302. Otherwise, the process ends.

Figure 4:
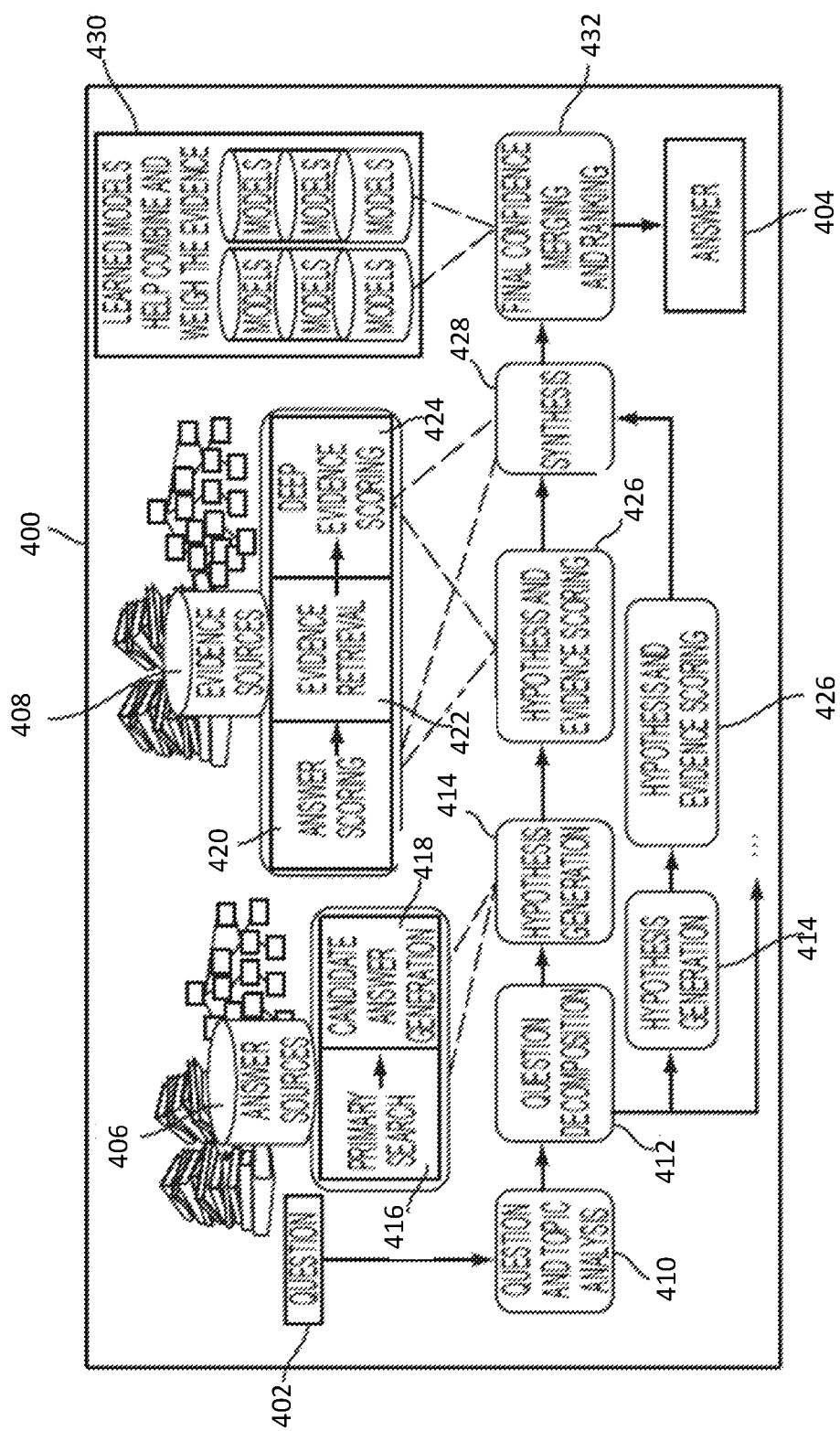
FIG. 4 depicts a high-level block diagram of a question-answer (QA) framework through which the response effectiveness evaluation processes may be implemented according to an embodiment.

Turning now to FIG. 4, a high-level block diagram of a question-answer (QA) framework 400 where embodiments described herein can be utilized is generally shown.

The QA framework 400 can be implemented to generate a ranked list of answers 404 (and a confidence level associated with each answer) to a given question 402. In an embodiment, general principles implemented by the framework 400 to generate answers 404 to questions 402 include massive parallelism, the use of many experts, pervasive confidence estimation, and the integration of shallow and deep knowledge. In an embodiment, the QA framework 400 shown in FIG. 4 is implemented by the WATSON™ product from IBM.

The QA framework 400 shown in FIG. 4 defines various stages of analysis in a processing pipeline. In an embodiment, each stage admits multiple implementations that can produce alternative results. At each stage, alternatives can be independently pursued as part of a massively parallel computation. Embodiments of the framework 400 don't assume that any component perfectly understands the question 402 and can just look up the right answer 404 in a database. Rather, many candidate answers can be proposed by searching many different resources, on the basis of different interpretations of the question, such as based on a category of the question. A commitment to any one answer is deferred while more and more evidence is gathered and analyzed for each answer and each alternative path through the system.

As shown in FIG. 4, the question and topic analysis 410 is performed and used in question decomposition 412. Hypotheses are generated by the hypothesis generation block 414 which uses input from the question decomposition 412, as well as data obtained via a primary search 416 through the answer sources 406 and candidate answer generation 418 to generate several hypotheses. Hypothesis and evidence scoring 426 is then performed for each hypothesis using evidence sources 408 and can include answer scoring 420, evidence retrieval 422 and deep evidence scoring 424.

A synthesis 428 is performed of the results of the multiple hypothesis and evidence scorings 426. Input to the synthesis 428 can include answer scoring 420, evidence retrieval 422, and deep evidence scoring 424. Learned models 430 can then be applied to the results of the synthesis 428 to generate a final confidence merging and ranking 432. A ranked list of answers 404 (and a confidence level associated with each answer) is then output.

Evidence retrieval and scoring plays a key role in the QA framework 400 shown in FIG. 4. Embodiments of identifying concepts can be utilized by the QA framework 400 to improve scoring results.

The framework 400 shown in FIG. 4 can utilize embodiments of identifying concepts described herein to create learned models 430 by training statistical machine learning algorithms on prior sets of questions and answers to learn how best to weight each of the hundreds of features relative to one another. These weights can be used at run time to balance all of the features when combining the final scores for candidate answers to new questions 402. In addition, embodiments can be used to generate a KB based on a corpus of data that replaces or supplements commercially available KBs.

In an embodiment, the output of the response effectiveness evaluation processes could be used to modify one or more configuration settings in the primary search 416 and candidate answer generation 418 phases of the pipeline. For example, by identifying that the user requires more generic answers, the query can be adapted to contain more simplified terms, such as hypernyms. Candidate answer generation 418 can be modified by applying simplification algorithms, and scoring 420 could take into account text complexity measures in scoring passages.

Technical effects and benefits include tapping into distinctive patterns that a user may exhibit through their queries and may render implicit feedback that accounts for the user's progress as they internalize answers given by response effectiveness evaluation processes. The response effectiveness evaluation processes implement strategies that enable the adaptive QA system to gather implicit feedback from the user without burdening the user, such as by identifying their subsequent actions for the implicit feedback rather than requiring the user to affirmatively "like" or "dislike" answers for explicit feedback, without negatively affecting answer quality and without affecting iteration runs at a much lower cost.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
providing, by a computing device, an answer to a search query received from a user; and
in response to receiving a subsequent search query from the user, determining by the computing device a level of effectiveness of the answer to the search query with respect to the user, the determining comprising:
comparing aspects of the search query to aspects of the subsequent search query; and
calculating, based on the comparing, a relevance score that indicates a measure of similarity between the aspects of the search query and the aspects of the subsequent search query; and
determining that the answer effectively answers the search query when the relevance score exceeds a threshold value, wherein the comparing includes evaluating domain-specific data elements identified in the subsequent search query as compared to domain-specific data elements identified in the search query, wherein:
upon determining an expansion in the domain-specific data elements for the subsequent search query as compared to the domain-specific data elements for the search query, calculating the relevance score commensurate with a level of the expansion, the relevance score increasing in direct relation to increases in the level of expansion; and
upon determining at least one of a decrease in, or no change to, domain-specific data elements identified in the subsequent search query as compared to domain-specific data elements identified in the search query, and an increase in generalized domain-related data elements identified in the subsequent search query as compared to the search query, calculating the relevance score commensurate with the at least one of the decrease, no change to, and increase in the generalized domain-related data elements.

2. The method of claim 1, further comprising:
updating a profile of the user to indicate a level of understanding, the updating comprising one of:
updating the profile with a value reflecting an increase in a level of understanding by the user with respect to a topic of the search query based on the indicating the answer as effective in answering the search query; and
updating the profile with respect to the topic of the search query to indicate no increase in a level of understanding by the user based on the indicating the answer is ineffective in answering the search query.

3. The method of claim 2, wherein the domain-specific data elements include dependent relationships identified among the aspects.

4. The method of claim 2, further comprising:
modifying, by an automated component of the computing device, content in the subsequent query based on the level of understanding, wherein an answer to the subsequent query is more generalized or more specific based on the level of understanding.

5. The method of claim 2, wherein the aspects include a focus of the first and second queries, the method further comprising tracking queries received from the user based on the focus and tracking responsive levels of understanding to determine a progression or regression in user understanding of a topic subject to the focus.

6. The method of claim 1, wherein the aspects include a duration of time between queries.

7. A computer program product comprising a computer readable storage medium having program instructions embodied therewith, wherein the computer readable storage medium is not a transitory signal per se, the program instructions executable by a computer processor to cause the computer processor to perform a method comprising:
providing an answer to a search query received from a user; and
in response to receiving a subsequent search query from the user, determining a level of effectiveness of the answer to the search query with respect to the user, the determining comprising:
comparing aspects of the search query to aspects of the subsequent search query; and
calculating, based on the comparing, a relevance score that indicates a measure of similarity between the aspects of the search query and the aspects of the subsequent search query; and
determining that the answer effectively answers the search query when the relevance score exceeds a threshold value, wherein the comparing includes evaluating domain-specific data elements identified in the subsequent search query as compared to domain-specific data elements identified in the search query, wherein:
upon determining an expansion in the domain-specific data elements for the subsequent search query as compared to the domain-specific data elements for the search query, calculating the relevance score commensurate with a level of the expansion, the relevance score increasing in direct relation to increases in the level of expansion; and
upon determining at least one of a decrease in, or no change to, domain-specific data elements identified in the subsequent search query as compared to domain-specific data elements identified in the search query, and an increase in generalized domain-related data elements identified in the subsequent search query as compared to the search query, calculating the relevance score commensurate with the at least one of the decrease, no change to, and increase in the generalized domain-related data elements.

8. The computer program product of claim 7, wherein the method further comprises:
updating a profile of the user to indicate a level of understanding, the updating comprising one of:
updating the profile with a value reflecting an increase in a level of understanding by the user with respect to a topic of the search query based on the indicating the answer as effective in answering the search query; and
updating the profile with respect to the topic of the search query to indicate no increase in a level of understanding by the user based on the indicating the answer is ineffective in answering the search query.

9. The computer program product of claim 8, wherein the domain-specific data elements include dependent relationships identified among the aspects.

10. The computer program product of claim 8, wherein the method further comprises:
modifying, by an automated component of the computing device, content in the subsequent query based on the level of understanding, wherein an answer to the subsequent query is more generalized or more specific based on the level of understanding.

11. The computer program product of claim 8, wherein the aspects include a focus of the first and second queries, the method further comprising tracking queries received from the user based on the focus and tracking responsive levels of understanding to determine a progression or regression in user understanding of a topic subject to the focus.

12. The computer program product of claim 7, wherein the aspects include a duration of time between queries.

13. A system, comprising:
a memory having computer readable instructions; and
a processor for executing the computer readable instructions, the computer readable instructions including:
providing an answer to a search query received from a user; and
in response to receiving a subsequent search query from the user, determining a level of effectiveness of the answer to the search query with respect to the user, the determining comprising:
comparing aspects of the search query to aspects of the subsequent search query; and
calculating, based on the comparing, a relevance score that indicates a measure of similarity between the aspects of the search query and the aspects of the subsequent search query; and
determining that the answer effectively answers the search query when the relevance score exceeds a threshold value wherein the comparing includes evaluating domain-specific data elements identified in the subsequent search query as compared to domain-specific data elements identified in the search query, wherein:
upon determining an expansion in the domain-specific data elements for the subsequent search query as compared to the domain-specific data elements for the search query, the computer readable further include calculating the relevance score commensurate with a level of the expansion, the relevance score increasing in direct relation to increases in the level of expansion; and
upon determining at least one of a decrease in, or no change to, domain-specific data elements identified in the subsequent search query as compared to domain-specific data elements identified in the search query, and an increase in generalized domain-related data elements identified in the subsequent search query as compared to the search query, the computer readable instructions further include calculating the relevance score commensurate with the at least one of the decrease, no change to, and increase in the generalized domain-related data elements.

14. The system of claim 13, wherein the computer readable instructions further include:
   updating a profile of the user to indicate a level of understanding, the updating comprising one of:
   updating the profile with a value reflecting an increase in a level of understanding by the user with respect to a topic of the search query based on the indicating the answer as effective in answering the search query; and
   updating the profile with respect to the topic of the search query to indicate no increase in a level of understanding by the user based on the indicating the answer is ineffective in answering the search query.

15. The system of claim 14, wherein the domain-specific data elements include dependent relationships identified among the aspects.

16. The system of claim 14, wherein the computer readable instructions further include:
   modifying, by an automated component of the computing device, content in the subsequent query based on the level of understanding, wherein an answer to the subsequent query is more generalized or more specific based on the level of understanding.

17. The system of claim 14, wherein the aspects include a focus of the first and second queries, wherein the computer readable instructions further include tracking queries received from the user based on the focus and tracking responsive levels of understanding to determine a progression or regression in user understanding of a topic subject to the focus.

* * * * *